US009146115B2

(12) United States Patent
Geffner et al.

(10) Patent No.: US 9,146,115 B2
(45) Date of Patent: Sep. 29, 2015

(54) LOCATION ENHANCED MEETINGS AND COLLABORATION

(75) Inventors: Steven Paul Geffner, Bothell, WA (US); Gary Caldwell, Redmond, WA (US); C. Joe Coplen, Kirkland, WA (US); Christopher Hugh Pratley, Seattle, WA (US); Michael Ammerlaan, Sammamish, WA (US); Steve Zaske, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/275,345

(22) Filed: Oct. 18, 2011

(65) Prior Publication Data

US 2013/0096813 A1   Apr. 18, 2013

(51) Int. Cl.
| | |
|---|---|
| *G01C 21/20* | (2006.01) |
| *H04W 4/02* | (2009.01) |
| *G01C 21/34* | (2006.01) |
| *G01C 21/36* | (2006.01) |
| *H04W 4/00* | (2009.01) |
| *H04W 4/20* | (2009.01) |

(52) U.S. Cl.
CPC ............ *G01C 21/20* (2013.01); *G01C 21/3438* (2013.01); *G01C 21/3697* (2013.01); *H04W 4/003* (2013.01); *H04W 4/02* (2013.01); *H04W 4/206* (2013.01)

(58) Field of Classification Search
USPC ......................................................... 701/117
See application file for complete search history.

(56) References Cited

U.S. PATENT DOCUMENTS

| | | | | |
|---|---|---|---|---|
| 5,948,040 | A * | 9/1999 | DeLorme et al. ............. | 701/426 |
| 6,898,569 | B1 | 5/2005 | Bansal et al. | |
| 6,980,993 | B2 | 12/2005 | Horvitz et al. | |
| 7,085,818 | B2 | 8/2006 | Brown et al. | |
| 7,233,933 | B2 | 6/2007 | Horvitz et al. | |
| 7,248,872 | B2 | 7/2007 | Bassett et al. | |
| 7,693,735 | B2 | 4/2010 | Carmi et al. | |
| 7,925,525 | B2 | 4/2011 | Chin | |
| 8,024,111 | B1 * | 9/2011 | Meadows et al. ............. | 701/414 |

(Continued)

OTHER PUBLICATIONS

Cameron, et al., "TimeToGo: A Mobile Application for Departure Alerts Based on Google Calendar, Transit and GPS Data", Sep. 30-Oct. 3, 2009, Retrieved at <<http://www.uxrich.com/docs/timetogo/TimeToGo_research_paper.pdf>>, UbiComp, pp. 10.

(Continued)

*Primary Examiner* — Nicholas Kiswanto
(74) *Attorney, Agent, or Firm* — Jessica Meyers; Jim Ross; Micky Minhas

(57) ABSTRACT

A location enhanced meeting service ("LEM Service") may provide a geographical based map indicating meeting locations for a selected day. The user can view locations of meetings for a scheduled day, along with travel times. Conditions impacting travel time may be provided to the user along with updated estimated travel times and suggested alternative routes. The scale of the map may be based on the geographical diversity of the attendees. A user can view a location enhanced meeting map for particular meeting, and obtain directions to the meeting. The user can also request to view attendee's locations to the meeting on the map prior to the meeting. If an attendee is expected to be late, the user may establish a voice conference with that attendee. If a user is expected to be late to a meeting, the user may provide a notification to the other attendees of the meeting.

20 Claims, 15 Drawing Sheets

(56) References Cited

U.S. PATENT DOCUMENTS

| | | | |
|---|---|---|---|
| 8,290,479 B2* | 10/2012 | Aaron et al. | 455/418 |
| 8,312,091 B2* | 11/2012 | Horstmann et al. | 709/206 |
| 8,627,210 B2* | 1/2014 | Vijayakumar et al. | 715/753 |
| 2003/0197731 A1* | 10/2003 | Chiu et al. | 345/764 |
| 2007/0060108 A1* | 3/2007 | East et al. | 455/414.1 |
| 2007/0264968 A1* | 11/2007 | Frank et al. | 455/404.2 |
| 2007/0264969 A1* | 11/2007 | Frank et al. | 455/404.2 |
| 2007/0271031 A1* | 11/2007 | Jung et al. | 701/204 |
| 2007/0281689 A1* | 12/2007 | Altman et al. | 455/435.1 |
| 2009/0160676 A1* | 6/2009 | Stehle et al. | 340/905 |
| 2009/0216438 A1* | 8/2009 | Shafer | 701/210 |
| 2009/0292782 A1* | 11/2009 | Kim et al. | 709/206 |
| 2010/0250369 A1* | 9/2010 | Peterson et al. | 705/14.58 |
| 2010/0274855 A1* | 10/2010 | Wassingbo | 709/206 |
| 2010/0332282 A1* | 12/2010 | Bradley et al. | 705/9 |
| 2011/0028132 A1* | 2/2011 | Bos | 455/414.2 |
| 2011/0066468 A1* | 3/2011 | Huang et al. | 705/9 |
| 2011/0130958 A1 | 6/2011 | Stahl et al. | |
| 2011/0195727 A1* | 8/2011 | Proulx et al. | 455/456.3 |
| 2012/0053829 A1* | 3/2012 | Agarwal et al. | 701/418 |
| 2012/0054288 A1* | 3/2012 | Wiese et al. | 709/206 |
| 2012/0136572 A1* | 5/2012 | Norton | 701/465 |

OTHER PUBLICATIONS

Hughes, Neil, "Apple investigating dynamic location-, traffic-aware iPhone calendar alerts", Jun. 2, 2011, Retrieved at <<http://www.appleinsider.com/articles/11/06/02/apple_investigating_dynamic_location_traffic_aware_iphone_calendar_alerts.html>>, pp. 6.

\* cited by examiner

LOCATION ENHANCED MEETINGS AND COLLABORATION

BACKGROUND

Location information is readily available in many mobile devices, such as smart phones, tablet computers, and other forms of mobile computing devices. Many of these mobile devices determine a geographical location by using global positioning system ("GPS") technology, which can be used by the mobile device to determine its current location. Various applications executing on the mobile device can use the location information for providing services. The mobile device can also report the user's position to another system, which can also use location information for providing services. In other circumstances, instead of the device reporting its location, the device location may be detected by other equipment, using various techniques such as signal triangulation. Thus, location information can be obtained even if the device is not capable of processing GPS signals.

Knowing the location of a user can be useful in augmenting services provided to the user. For example, location information is useful in determining a route from a current location to an indicated destination. Location information can also be used to inform a user of the location of colleagues in a work environment. Mobile devices conventionally have used only location information of the device itself, in part because it can be difficult for mobile devices to maintain location information about other users. Location information from a plurality of users can be used to enhance enterprise type services and increase productivity of users on a collective basis.

It is with respect to these and other considerations that the disclosure made herein is presented.

SUMMARY

Concepts and technologies are described herein for using location information to augment meeting related services. Location information of a user can be used to inform the user of the locations of upcoming scheduled meetings. The user can be provided with location information of other attendees with respect to a given scheduled meeting, which allows the user to be informed of attendees traveling to the meeting.

In one embodiment, a method provides location enhanced meeting information to a user for a meeting including receiving a request, by a processor, from a user's mobile computing device for the location enhanced meeting information and retrieving meeting information, by the processor, comprising a meeting location, a list comprising identification of one or more meeting attendees, and a starting time. The method further includes determining, by the processor, a user location based on the current location of a user's mobile computing device initiating the request and determining, by the processor, an attendee location of an attendee of the one or more meeting attendees, wherein the attendee is not located at the meeting location. The method further includes generating, by the processor, a meeting location map indicating the user location and the attendee location of the attendee and determining, by the processor, an estimated arrival time of the attendee to the meeting location. The method further includes indicating, by the processor, the estimated arrival time of the attendee on the meeting location map, and providing the user a geographical map indicating the meeting location and the attendee location in response to the request.

In another embodiment, a method provides for meeting information to a user involving retrieving, by a processor, meeting information of a plurality of meetings of the user for a selected day, wherein the each meeting information comprises a meeting location and a meeting time. The method further involves retrieving, by the processor, a geographical map suitable for displaying the meeting location of each respective meeting, and generating, by the processor, a meeting map comprising the geographical map with the plurality of meetings and each meeting location indicated thereon, and providing, by the processor, the meeting map to the user in response to a user request to a calendar application for viewing the meeting information for the plurality of meetings for the selected day.

In another embodiment, a system for providing a location enhanced meeting information includes a memory storing meeting location information for a user, and a processor configured to receive a request for a location enhanced meeting map for a meeting. The processor is configured to determine a time period between the current time and a starting time of the meeting, determine the time period is below a threshold, and query a location server for a location of an attendee. The processor is further configured to query an estimated time of arrival server for an estimated time of arrival for the attendee, and provide the user with the location enhanced meeting map indicating a current location of the meeting and the location of the attendee.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
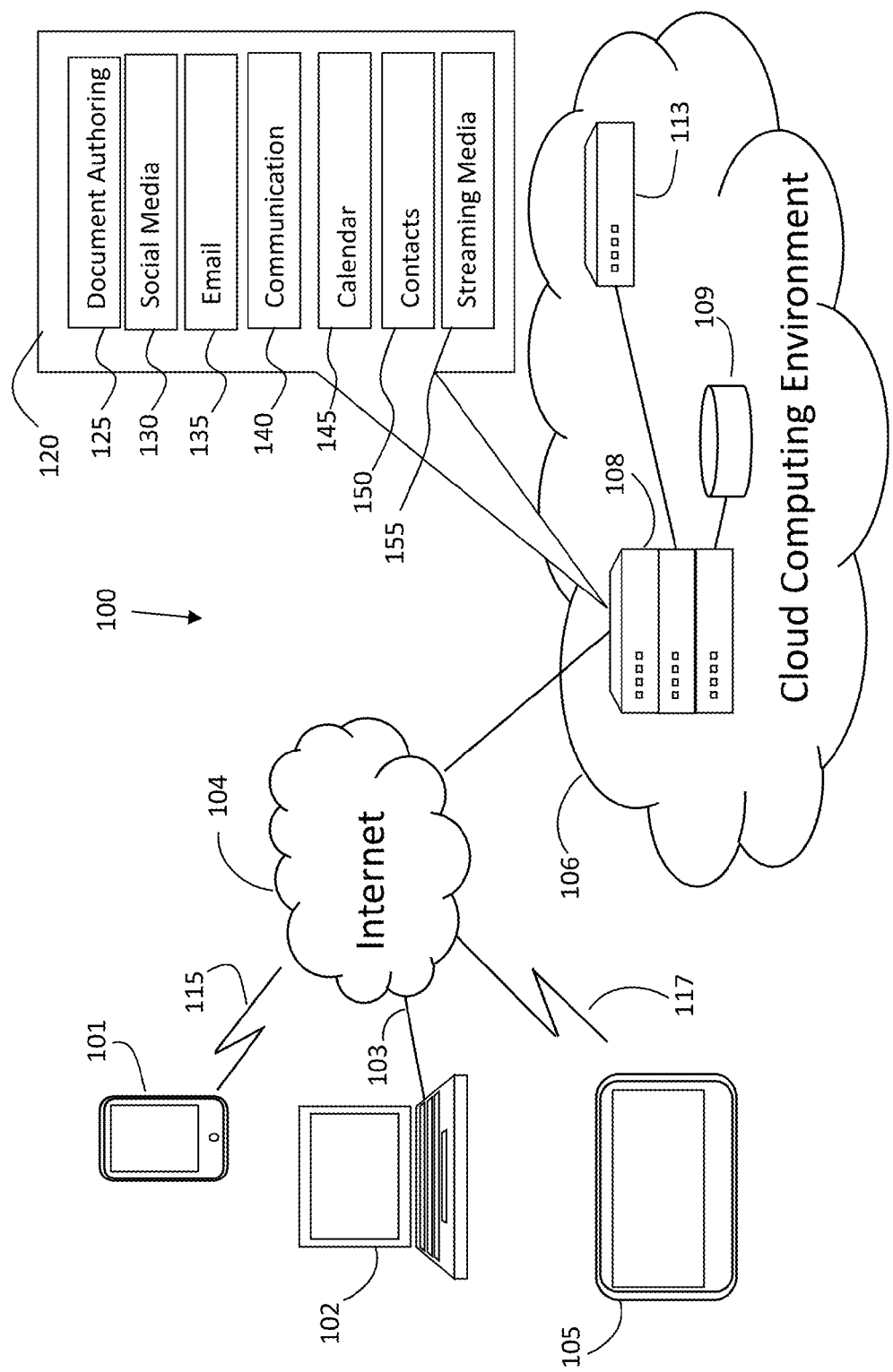
FIG. 1 is a schematic diagram showing one context of a system for using location enhanced meeting information in accordance with one embodiment presented herein.

The following detailed description is directed to using location information of a user in the context of a scheduled meeting, and/or location information of invited attendees of the meeting, in order to provide location enhanced meeting related services. Location enhanced meeting services ("LEM Services") are facilitated by knowing location information of a user, and/or other attendees of a meeting. Location information of a user can be obtained, in some instances, by a mobile device carried by the user reporting its location. Smart phones and tablet computers commonly incorporate GPS technology allowing determination of the user's location. This information can be sent by the mobile device to other systems that in turn use the location information to provide LEM services. Other technology can detect and report a location of a mobile device without requiring the mobile device to detect and report its location.

In the following detailed description, references are made to the accompanying drawings that form a part hereof, and which are shown by way of illustration of specific embodiments or examples. Referring now to the drawings, in which like numerals represent like elements throughout the several figures, aspects of a system for providing LEM services are provided.

One context for providing LEM Services is illustrated in FIG. 1. FIG. 1 is a schematic diagram showing one context of a system using location enhanced meeting information as provided in one embodiment presented herein. System 100 of FIG. 1 shows various types of devices that can be used in conjunction with a LEM service. A smart phone type mobile device 101 may be used that is connected to a communications network, such as the Internet 104, which in turn is connected to a cloud computing environment 106. The smart phone 101 may communicate via a wireless connection 115, which can be based on various technologies, including but not limited to: GSM, CDMA, 3G, 4G, EDGE, short message service, Wi-Fi, etc. In addition, the user may use a laptop 102 connected through a wired connection 103 to the Internet 104. The wired connection may be accomplished, using various technologies, including using a cable modem, DSL adaptor, Wi-Fi adaptor, or any other technology for accomplishing an Internet data connection. The connection between the computing device 102 and the Internet 104 is shown as a wired connection 103, although other forms can be used, including the aforementioned wireless communication forms.

In addition, a tablet computing device 105 can be used, which can also access the Internet 104 in a wireless manner, including cellular, Wi-Fi, or other forms known. The smart phone 101, laptop 102, and tablet computing device 105 are only some of the types of devices that can be used in accessing the LEM Service. Other device types not disclosed can be adapted and used.

The devices may interact with the cloud computing environment 106. The cloud computing environment is shown as comprising one or more servers 108 that may comprise a variety of technologies, including distributed processing systems, blade servers, parallel processing servers, etc. These servers typically access storage devices 109, which can be various types of solid state memory, disk storage systems, etc. The storage devices 109 can be used to store data for various applications. For purposes of illustration, a single server 108 will be referenced, although other embodiments may use a plurality of servers.

In one embodiment, the user accesses one or more application programs 120 executing on the server 108 in the cloud computing environment 106. These application programs 120 may comprise applications for authoring a document 125, providing various social media applications 130, email or other type of messaging applications 135, and other types of communication applications 140, such as data conferencing, voice services, video chat services etc. Other application programs may include a contacts application 150 that is able to maintain and organize contact information, and a streaming media application 155 providing various streaming media services.

In addition, the cloud computing environment 106 can provide a calendar application 145, which maintains meeting information scheduled for the user as well as other attendees. The calendar application 145 may interact, or be integrated with, the contacts application 150 for coordinating meeting invitations, notices, etc. The calendar application 145 may also coordinate, or integrate with, other applications, such as the communication application 140. The calendar application 145 maintains information about a meeting, which may include scheduled time of the meeting, invited attendees, location, and the purpose of the meeting. The calendar application 145 may store, or have access to location information of the invited attendees, communication devices associated with the attendees, and the attendees' contact information. Thus, the calendar application 145 may know whether the attendee will be attending in person, via video conference, or some other arrangement.

All of these applications may maintain information for various users, which can be stored local to the server 108 or on a storage device 109. Further, the applications in the server 108 may synchronize information stored by an application for a user on a particular device, such as a smart phone 101 or a tablet computer 105.

In other embodiments, the user may execute the same or similar application programs 120 on their computing device 101, 102, and 105. These devices may or may not access the cloud computing environment 106 in order to provide LEM Services to the user. The application programs 120 may be executed on a processor in the computing device, and data may be stored on a memory store in the computing device. Other configurations are possible for performing the processes disclosed herein including using a variety of computer devices.

In one embodiment, the server 108 maintains information for a set of users that are associated with a scheduled meeting. Specifically, the calendar application 145 maintains information for the scheduled meeting on the calendars for the attendees. The calendar application 145 may also maintain location information for the user and each attendee, or access another server which does maintain the location information. Thus, the server 108 is able to maintain location information for the set of attendees.

The applications 120 may also access application programs executing on the same or another server 113. The other server 113 may be remote, or local, and may execute different applications than the applications 120. For example, the server 113 could be a search engine accessing data based on a query. In one embodiment, the server 113 could provide search results to the server 108 regarding a given location, such as traffic conditions, weather conditions, local events, airport delays, etc.

In another embodiment, the server 113 could store location information for the user and attendees. This could be, in one embodiment, a server associated with a business enterprise that maintains employee location information during business hours. In this manner, the calendar application program 145 in the server 108 may maintain location information about a meeting attendee, and can access supplemental information regarding an attendee's location at a given time.

Figure 2:
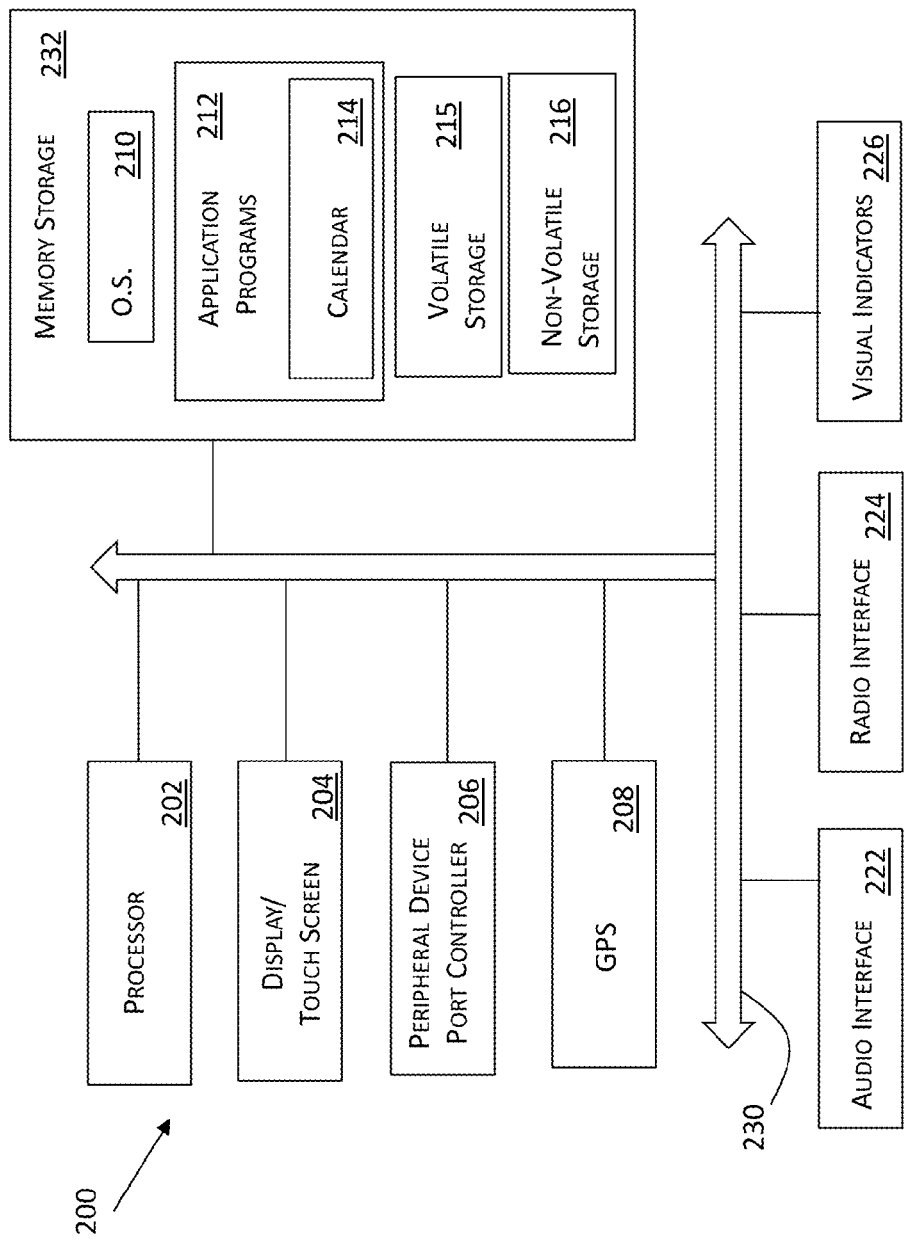
FIG. 2 is a schematic diagram illustrating a mobile device operative to provide location enhanced meeting information to a user in accordance with one embodiment disclosed herein.

One embodiment of a computing device, such as a smart phone 101, for interacting with the LEM Service, is shown in FIG. 2. FIG. 2 is a schematic diagram illustrating a mobile device 200 operative to provide location enhanced meeting information to a user in accordance with one embodiment disclosed herein. Other architectures or computers may be used to execute the software components presented herein.

The computer architecture shown in FIG. 2 includes a processor 202 (a.k.a. as a centralized processing unit or "CPU"), a memory storage 232, including a volatile storage portion 215, such as random access memory ("RAM"), and a non-volatile portion 216, such as read-only memory ("ROM"). A system bus 230 that couples the memory to the CPU 202. A basic input/output system containing the basic routines that help to transfer information between elements within the mobile device 200, such as during startup, is stored in the non-volatile storage 216. The memory storage 232 further stores an operating system 210, application programs 212, which can comprise a calendar module 214. Other application programs may be stored in memory storage 232.

The memory storage 232 is connected to the CPU 202 through a controller (not shown in FIG. 2), which in turn is connected to the bus 232. The memory storage 230 and its associated computer-readable media provide non-volatile storage for the mobile device 200. Although the description of computer-readable media contained herein can refer to a mass storage device, such as a hard disk or CD-ROM drive, it should be appreciated by those skilled in the art that computer-readable media can be any available computer storage media that can be accessed by the mobile device 200.

The mobile device 200 may connect to the network through a radio interface 224 connected to the bus 230. It should be appreciated that the radio interface 224 may also be utilized to connect to other types of networks and remote computer systems using a variety of wireless technologies. In other embodiments, connection to other types of network may be accomplished using a peripheral device port controller 206.

The peripheral device port controller 206 can be used for receiving and processing input from a number of other devices, including a keyboard, mouse, or electronic stylus (not shown in FIG. 2). Similarly, a peripheral device port controller 206 may provide output to a display screen, a printer, or other type of output device (also not shown in FIG. 2). In one embodiment, the computing device may incorporate a touch screen display 204. The touch screen display 204 functions to not only display information, but also to receive input from the user, including inputting text, commands, and controls.

The mobile device 200 may also incorporate a GPS module 208 which is capable of receiving GPS signals using an antenna (not shown in FIG. 2) and determine a location of the mobile device 200. The mobile device 200 may also incorporate an audio interface 222 for effecting voice communications and other functions. The mobile device 200 may also incorporate various visual indicators 226.

It should be appreciated that the software components described herein may, when loaded into the processor 202 and executed, transform the processor 202 and the overall mobile device 200 from a general-purpose computing system into a special-purpose computing system customized to facilitate the functionality presented herein. The processor 202 may be constructed from any number of transistors or other discrete circuit elements, which may individually or collectively assume any number of states. More specifically, the processor 202 may operate as a finite-state machine, in response to executable instructions contained within the software modules disclosed herein. These computer-executable instructions may transform the processor 202 by specifying how the processor 202 transitions between states, thereby transforming the transistors or other discrete hardware elements constituting the processor 202.

It also should be appreciated that the mobile device 200 may comprise other types of computing devices, including hand-held computers, embedded computer systems, e-book readers, personal digital assistants, and other types of computing devices known to those skilled in the art. It is also contemplated that the mobile device 200 may not include all of the components shown in FIG. 2, may include other components that are not explicitly shown in FIG. 2, or may utilize an architecture completely different than that shown in FIG. 2.

Figure 3:
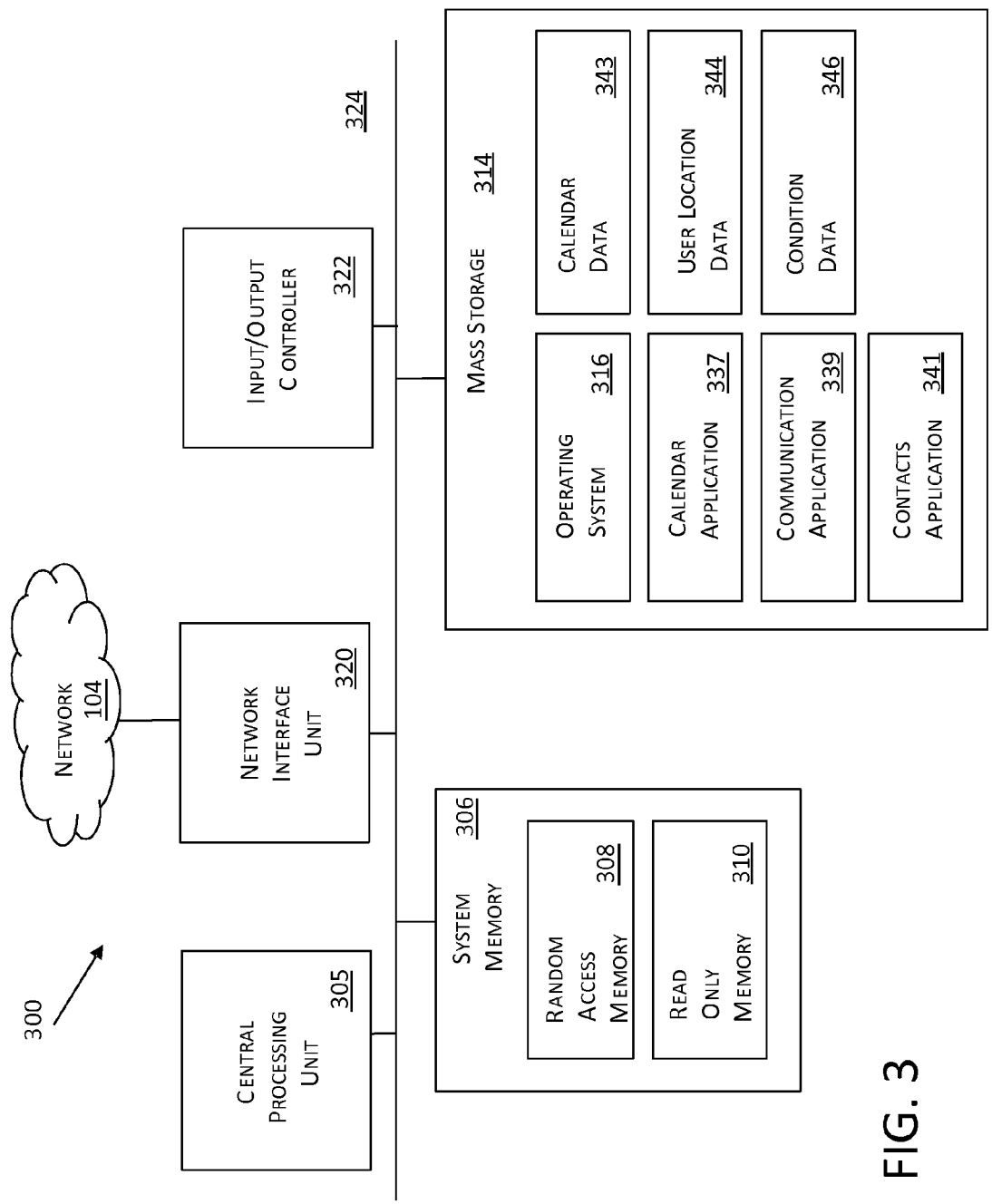
FIG. 3 is a schematic diagram illustrating a server computer operative to provide location enhanced meeting services to a user in accordance with one embodiment disclosed herein.

One embodiment of the server 108 which may be used in conjunction with providing the LEM Service is shown in FIG. 3. FIG. 3 is a schematic diagram illustrating a server computer operative to provide location enhanced meeting services to a user in accordance with one embodiment disclosed herein. FIG. 3 shows an illustrative computing architecture for a computer 300 capable of executing the software components described. The computer architecture shown in FIG. 3 may illustrate a conventional server computer, laptop, table, or other type of computer utilized to execute any aspect of the software components presented herein. Other architectures or computers may be used to execute the software components presented herein.

The computer architecture shown in FIG. 3 includes a central processing unit 305 ("CPU"), a system memory 306, including a random access memory 308 ("RAM") and a read-only memory ("ROM") 310, and a system bus 324 that couples the memory to the CPU 305. A basic input/output system containing the basic routines that help to transfer information between elements within the server 300, such as during startup, is stored in the ROM 310. The computer 300 further includes a mass storage device 314 for storing an operating system 316, application programs, and other program modules, as described herein.

The mass storage device 314 is connected to the CPU 305 through a mass storage controller (not shown), which in turn is connected to the bus 324. The mass storage device 314 and its associated computer-readable media provide non-volatile storage for the computer 300. Although the description of computer-readable media contained herein refers to a mass storage device, such as a hard disk or CD-ROM drive, it should be appreciated by those skilled in the art that computer-readable media can be any available computer storage media that can be accessed by the computer 300.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 300. The computer readable media does not encompass transitory signals.

According to various embodiments, the computer 300 may operate in a networked environment using logical connections to remote computers or servers through a network such as the network 104. The computer 300 may connect to the network 104 through a network interface unit 320 connected to the bus 324. It should be appreciated that the network interface unit 320 may also be utilized to connect to other types of networks and remote computer systems.

The computer 300 may also incorporate a radio interface (not shown) which can communicate wirelessly with network 104. The wireless communication may be based on any of the cellular communication technologies or other technologies, such as WiMax, Wi-Fi, or others.

The computer 300 may also incorporate a display (not shown) for displaying information. The computer 300 may also include an input/output controller 322 for receiving and processing input from a number of other devices, including a keyboard, mouse, or electronic stylus (not shown in FIG. 3). Similarly, an input/output controller 322 may provide output to a display screen, a printer, or other type of output device (also not shown in FIG. 3).

As mentioned briefly above, a number of program modules and data files may be stored in the mass storage device 314 and RAM 308 of the computer 300, including an operating system 316 suitable for controlling the operation of a networked computer. The mass storage device 314 and RAM 308 may also store one or more program modules or data files. In particular, the mass storage device 314 and the RAM 308 may store the calendar application 337, a communication application 339, and other applications such as a contact organizer application 341.

The same storage device 314 and the RAM 308 may store the calendar data 343, user location data 344, and other data, such as condition data 346. The condition data refers to data associated with traffic conditions, weather conditions, events, etc. The mass storage device 314 and the RAM 308 may also store other types of data.

It should be appreciated that the software components described herein may, when loaded into the CPU 305 and executed, transform the CPU 305 and the overall computer 300 from a general-purpose computing system into a special-purpose computing system customized to facilitate the functionality presented herein. The CPU 305 may be constructed from any number of transistors or other discrete circuit elements, which may individually or collectively assume any number of states. More specifically, the CPU 305 may operate as a finite-state machine, in response to executable instructions contained within the software modules disclosed herein. These computer-executable instructions may transform the CPU 305 by specifying how the CPU 305 transitions between states, thereby transforming the transistors or other discrete hardware elements constituting the CPU 305.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided, only to facilitate this discussion.

In light of the above, it should be appreciated that many types of physical transformations take place in the computer 300 in order to store and execute the software components presented herein. It also should be appreciated that the computer 300 may comprise other types of computing devices, including hand-held computers, embedded computer systems, personal digital assistants, and other types of computing devices known to those skilled in the art. It is also contemplated that the computer 300 may not include all of the components shown in FIG. 3, may include other components that are not explicitly shown in FIG. 3, or may utilize an architecture completely different than that shown in FIG. 3. For example, some devices may utilize a main processor in conjunction with a graphics display processor, or a digital signal processor. In another example, a device may have an interface for a keyboard, whereas other embodiments will incorporate a touch screen.

The computer 300 in conjunction with the user's computing devices 101, 102, or 105 can execute instructions that implement the LEM Service. The LEM Service allows a user to review meetings scheduled for a given clay, where the information can be provided in a graphical, map-based format with the meeting locations identified. In one embodiment, the user accesses their calendar application, which tracks the user's scheduled appointments, to view the map. The user may select, for example, a function that displays the locations of the scheduled meetings. The format presented to the user depends on the various factors, including the number of meetings and the relative geographical diversity. Typically, the format is a city map format, although various forms are possible as it will be seen.

Figure 4:
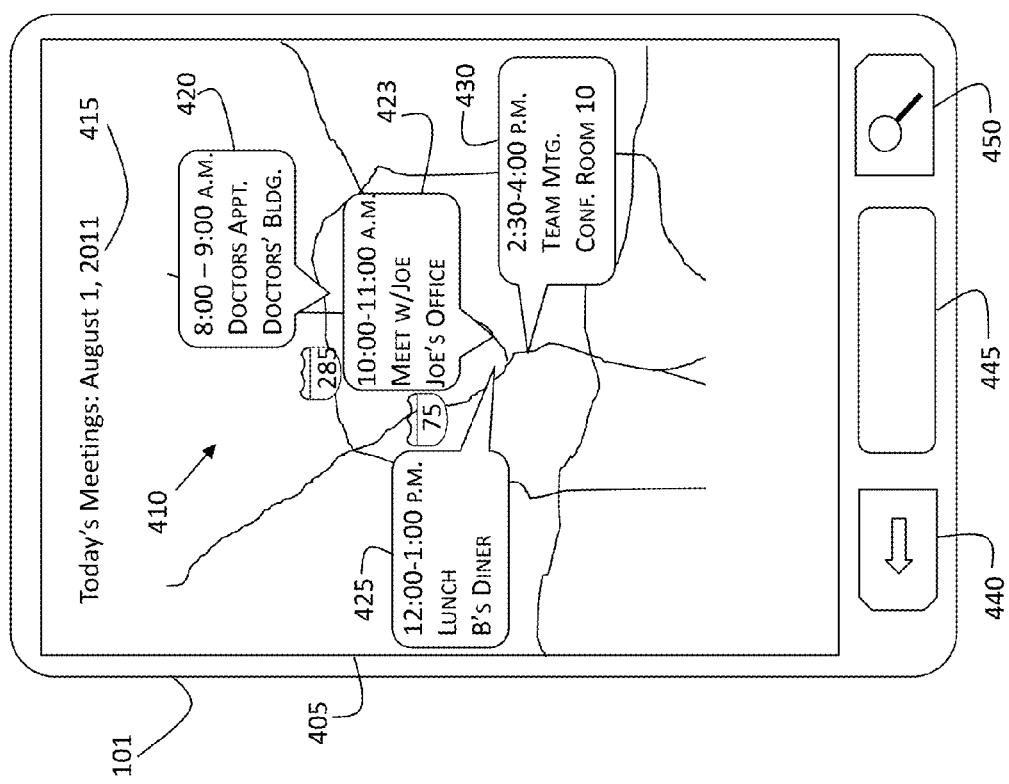
FIG. 4 is an illustrative display of location enhanced meeting information for multiple meetings provided to a user in accordance with one embodiment disclosed herein.

Turning to FIG. 4 now, FIG. 4 is an illustrative display of location enhanced meeting information showing multiple meetings in accordance with one embodiment disclosed herein. The mobile device in FIG. 4 can be a smart phone 101, with a display 405 that illustrates a map 410 of a metropolitan area. The display indicates a context text box 415, specifically indicating the purpose of the display map (e.g., the display pertains to today's scheduled meetings of Aug. 1, 2011).

In this illustration, four meetings are scheduled. All of these are meetings scheduled for the user of the mobile device. The first meeting is identified by a balloon 420 indicating the time, purpose, and location of the meeting. In this illustration, the meeting time is from 8:00-9:00 a.m., the purpose is for a doctor appointment, and the location is the Doctors Building. The second meeting 423 is from 10:00-11:00 a.m., the purpose is to meet with Joe, and the location is at Joe's Office. A third appointment 425, and a fourth appointment 430 are shown as well.

Each balloon 420, 423, 425, and 430 has a pointer to show the relative location of the respective meeting. The scale of the map depends on the relative distance between the various meetings. In this embodiment, the meetings are all within a city. Consequently, the largest map scale that can illustrate all the meetings is determined and the relevant portion of the map is illustrated on the mobile device 101. If the meetings were more geographically diverse (requiring a larger area to be displayed), a smaller scale map would be used. For example, if different cities were involved, a state level map may be presented. It is possible that the user may travel via an airplane to a meeting, and so that a national map may be appropriate. If the meetings were less geographically diverse, e.g., within the same building, then the map may be scaled larger. For example, a building floor plan or campus map may be presented to the user. For purposes herein, a building floor plan or campus layout is considered a "map".

The details of the map may vary based on scale. In this example, major interstate roads are identified. In other embodiments (smaller scale), only cities may be identified. In a large scale map comprising a building floor plan, room numbers on the floor plan may be identified.

Presenting the user's meetings in a location based form may facilitate the user selecting a route to the various meeting locations, anticipate travel times or difficulties going from one meeting to another, and/or schedule other activities in a nearby location. For example, the user may know that sufficient time exists before attending the next meeting so that further discussions at the present meeting are possible. The user may also request to view other locations on the meeting location map, such as retail stores, coffee shops, banks, restaurants, etc. This information can be useful for allowing the user to combine errands or other related activities in conjunction with the scheduled meetings.

Figure 5:
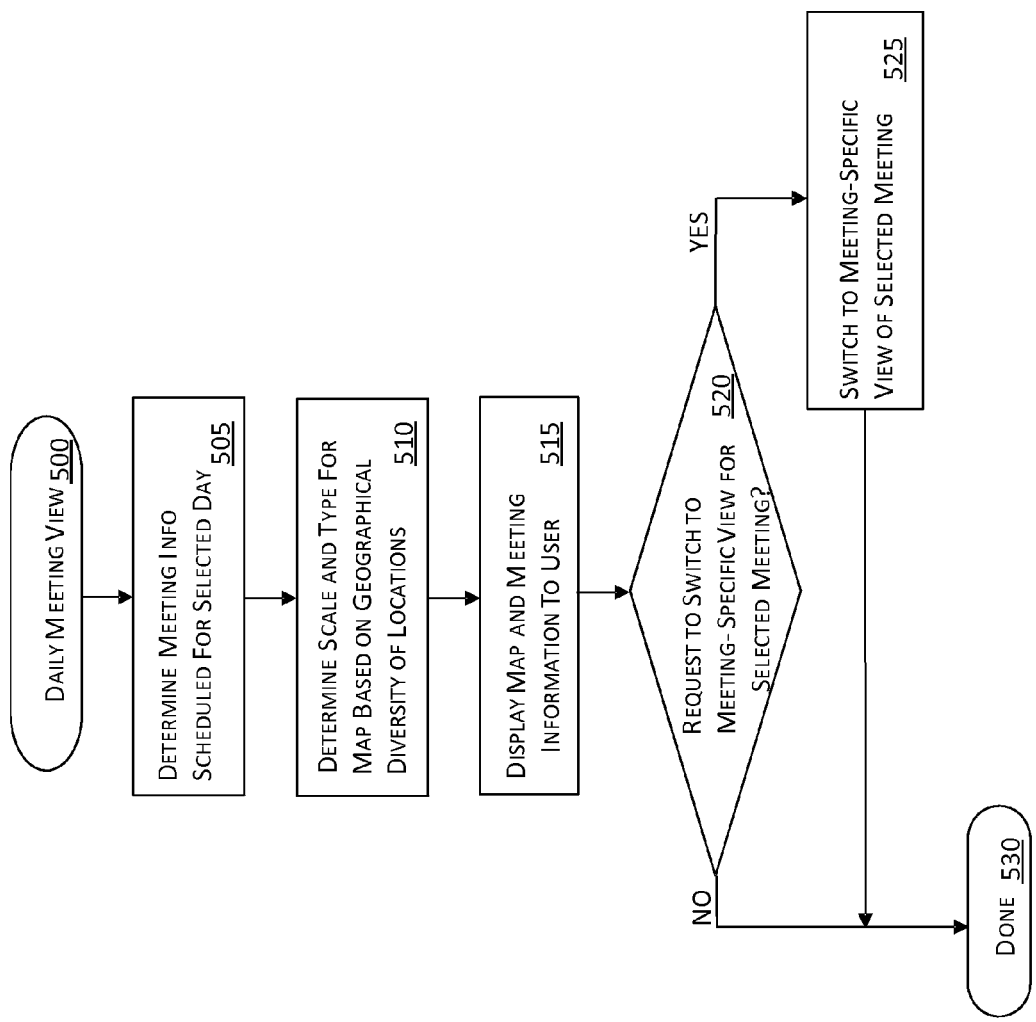
FIG. 5 is a process flow for displaying location enhanced meeting information to a user according to one embodiment disclosed herein.

The process flow performed by the computing device, such as the server 108, is illustrated in FIG. 5. FIG. 5 illustrates operations associated with presenting a location based map for all of the selected day's meetings for a user (a "daily meeting view"). The process begins in operation 500 with the user selecting a daily meeting view from the calendar application. The calendar application in operation 505 determines the meeting information for the meetings scheduled for the selected day. The meeting information comprises the information maintained by the calendar application for each meeting, and may include time of the meeting, purpose, attendees, and location. Although not necessary displayed in this view, the meeting location may also include the names of the attendees.

In operation 510, a map scale and type are selected based on the geographical locations of the scheduled meetings. The map generation may be performed by another server. For example, the server 108 providing the LEM Service may access another server 113 that provides server 108 with a map for a given set of locations. The server 108 may receive this map, integrate the meeting information, and provide the result to the user in operation 515. In other embodiments, the map generation could be performed in the local processing device or in server 108.

At this point, the user may request to switch to a meeting-specific view in operation 520. The meeting-specific view, which will be discussed shortly, presents information for a specific meeting, as opposed to all of the meetings in a clay. However, if there is only one meeting scheduled for the day, the two views may be similar. If the user desires to switch to the meeting-specific view in operation 520, then the meeting-specific view is displayed in operation 525. The meeting-specific view may provide location information of the attendees, whereas the dialer meeting view typically does not. Otherwise, there is no change to the daily meeting view and the process is completed at operation 530.

Switching to a meeting-specific view provides location enhanced meeting information about a specific meeting scheduled on the selected day. Switching to this view can be indicated by a user, e.g., by selecting a specific meeting on the daily meeting view and invoking a function to provide location enhanced meeting information.

Figure 6A:
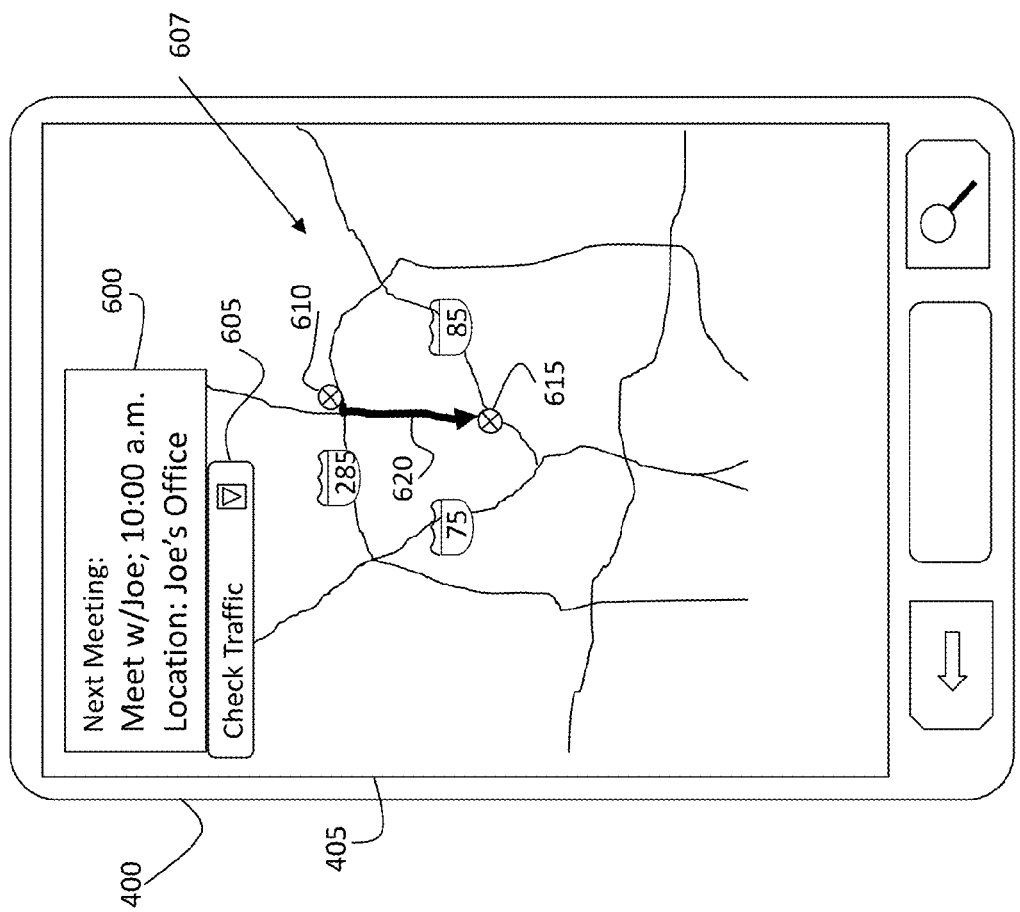
FIGS. 6A-6D illustrate various user interfaces for providing location enhanced meeting information for a single meeting according to one embodiment disclosed herein.

There may be various types of location enhanced meeting-specific views. One such meeting-specific view is shown in FIG. 6A. This view may be initially presented to the user when selecting, for example, the next scheduled meeting from the daily meeting view. In FIG. 6A, the mobile device 101 and its display 405 present a map 607 with the user's current location 610 indicated and the location 615 of the selected meeting. In various embodiments, different icons, colors, flashing states, etc., can be used to indicate the meeting location. The meeting-specific view indicates the meeting information in a text box 600.

The geographical diversity between the user's current location and the meeting location can be used to adjust or select the scale of the map 607 as appropriate. In this embodiment, the distance between the user's current location and the meeting location is within the same metropolitan area. If this distance is greater than a threshold, then a map of a different scale is displayed. For example, if the distance is 10 miles, than a city roadmap may be appropriate.

Once it is determined that a city roadmap is appropriate, then the LEM Service can also provide the user with a suggested traffic route 620. The user interface can also provide the user with a menu option 605 for checking traffic conditions along the suggested route.

Figure 6B:
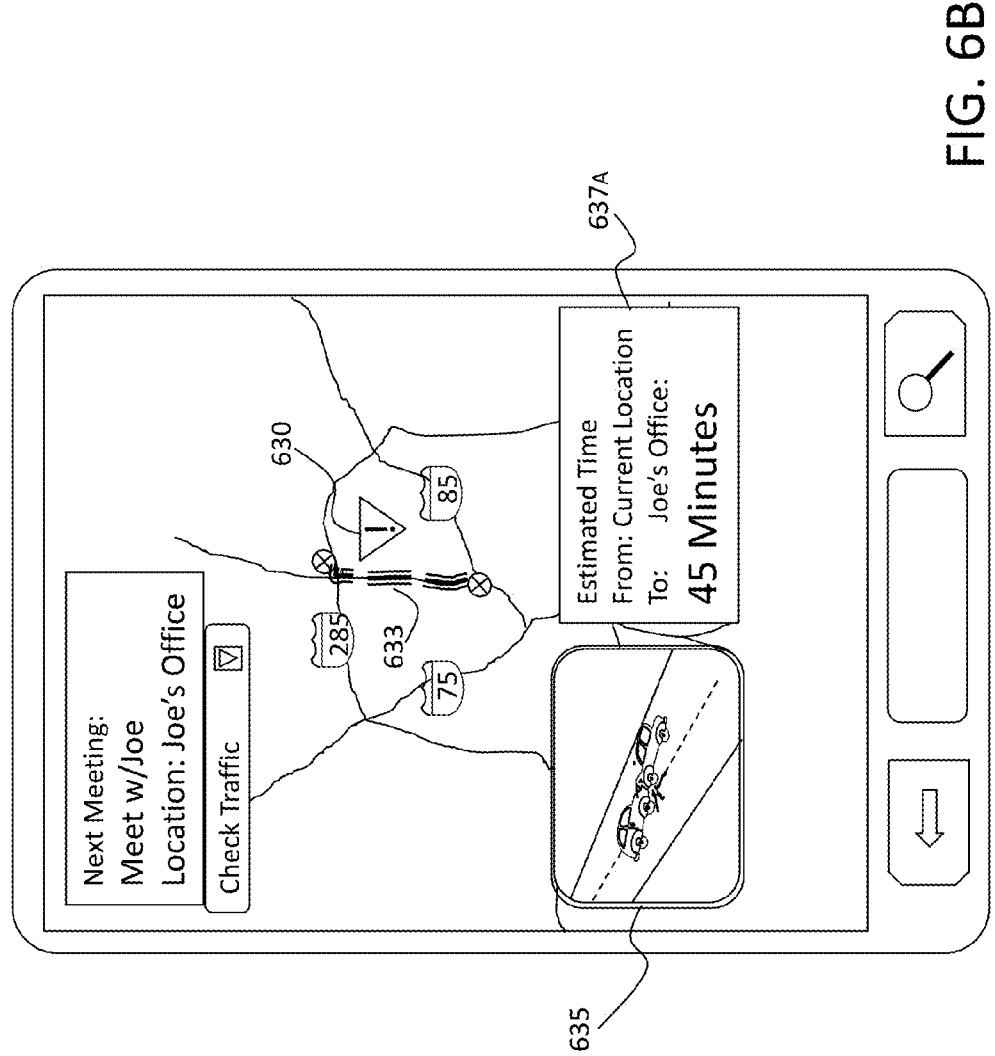

Assuming the user selects this option, one possible response is to provide the user interface shown in FIG. 6B. The service can access third party search engines for estimating a travel time 637a to the meeting location, and/or ascertaining any conditions impacting travel to the meeting. For example, publicly operated traffic congestion maps or images indicating accidents, road closures, highway construction, etc. could be consulted to provide a suggest route and/or travel time. In this embodiment, a camera image 635 is provided showing images along the suggested travel route. In one embodiment, real-time images of highways along the route may be obtained from governmental transportation agencies. Further, the suggested route indicated may change in color or emphasis 633, as well as provide an icon 630 warning of traffic delays.

Figure 6C:
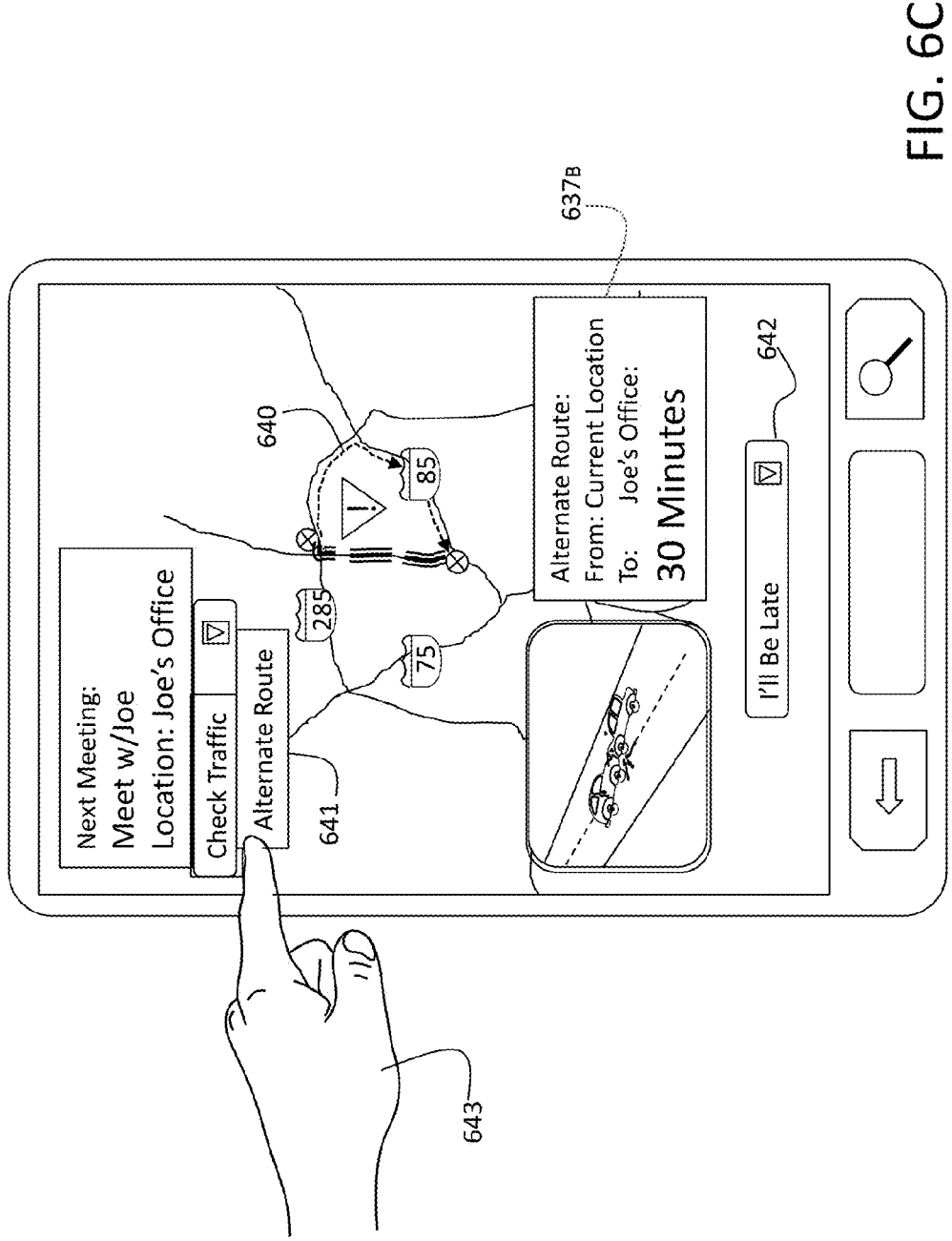

The user may be presented with an option, shown in FIG. 6C, of checking alternative traffic routes to the meeting location. In FIG. 6C, the user's hand 643 is shown selecting a menu function 641 for checking alternative routes. The alternative route 640 is shown on the map, along with a text box 637b of the estimated travel time.

The estimated travel time, which is shown as 30 minutes, may result in the user arriving late to the meeting. This can be determined by comparing the current time added to the travel time to determine an arrival time. If the arrival time is later than the scheduled meeting time, this means the user will be late. If the user is late, or is expected to arrive beyond a certain threshold (e.g., more than 5 minutes late), then the user may be prompted with another menu option 642 to notify the other attendees of the meeting that the user will arrive late. Other notification options can indicate to the other attendees how late the user will be, whether to wait for his arrival, start the meeting in the user's absence, etc.

Figure 6D:
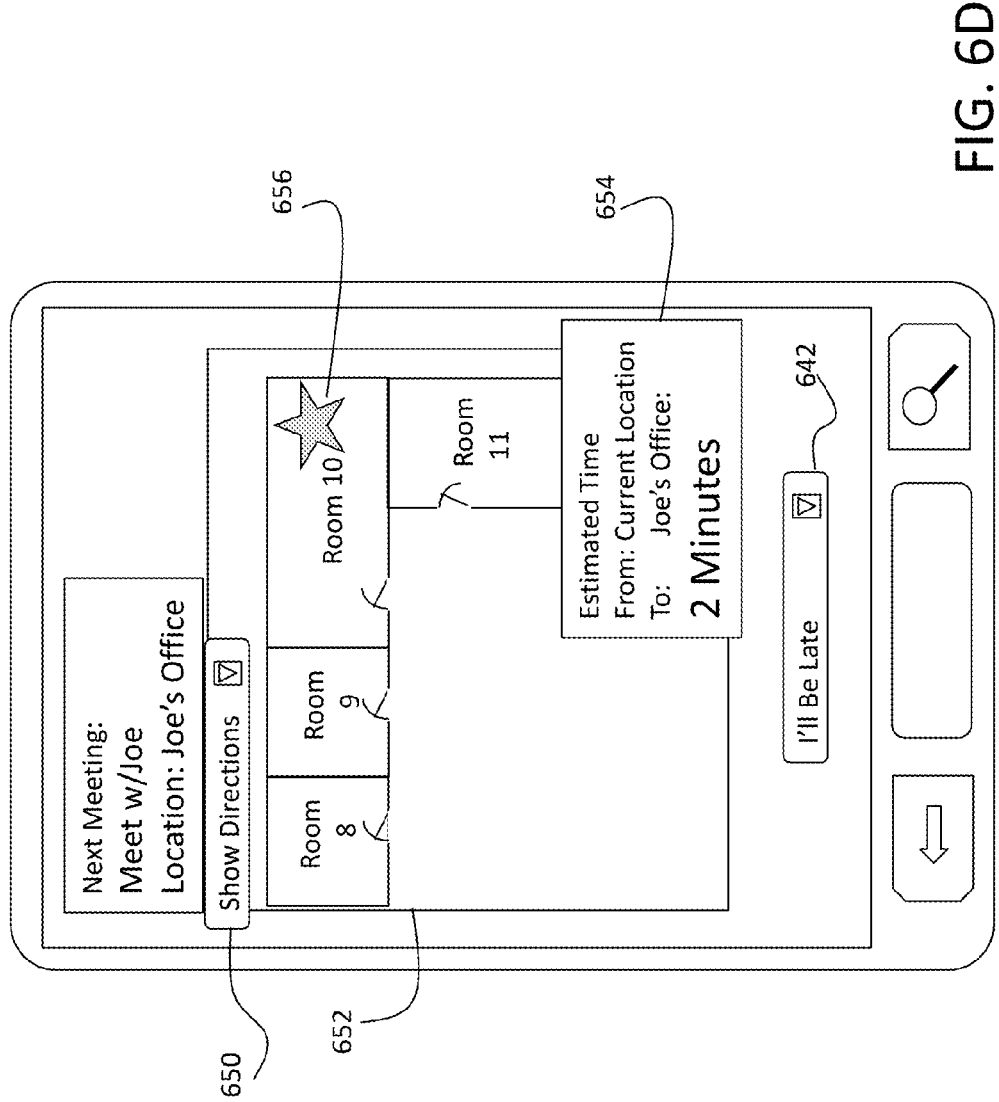

FIGS. 6A-6C display a specific meeting view map based on a distance of several miles between the user's current location and the meeting location. FIG. 6D illustrates another embodiment of a map when the user's current location is relatively close to the meeting location. This could be defined, again, in terms of a threshold. For example, if the user is within several hundred yards within the meeting location, then the map provided could be a building floor plan or a campus layout map, as opposed to a roadmap. In FIG. 6B, a building floor plan is shown to the user.

For example, the user may have entered an office building, and is seeking directions to Joe's Office, the location of the scheduled meeting. The LEM Service is cognizant of the relative distance from the current location to the meeting location and provides a depiction of the building floor plan with an icon 656 indicating the meeting location. An updated text box 654 is provided indicating the updated estimated arrival time. Depending on the planned arrival time, a late arrival notification option 642 may be presented to the user. Based on the type of map presented, the user interface may be altered. Specifically, the drop down menu 650 may reflect the proximity of the user to the meeting location. Since proximity suggests the user is walking to the meeting destination, it is not appropriate to advise the user of traffic conditions. In this embodiment, the user can request directions to the meeting destination.

The various user interfaces illustrate the type of information that can be presented to a user for a location enhanced, meeting-specific view. Other embodiments may provide additional functions, options, or information to the user than what is depicted. For example, depending on the relative distance to the meeting location, the LEM Service may access various types of condition related data. If the meeting location is distant, it may be inferred that the user may travel to the meeting location by air travel. If so, then weather conditions at the location may be obtained and provided to the user. If the meeting location is within the same metropolitan area, then it may be inferred that the user may travel to the meeting location by car. In this case, the weather conditions at the location are likely to be similar to the user's current location and providing weather information for the destination may not be useful. However, because travel is likely to occur by car, information regarding traffic conditions may be more appropriate. If the meeting location is nearby, then it may be inferred the user is traveling on foot. In this case, traffic or weather conditions at the location may not be very useful.

Figure 7A:
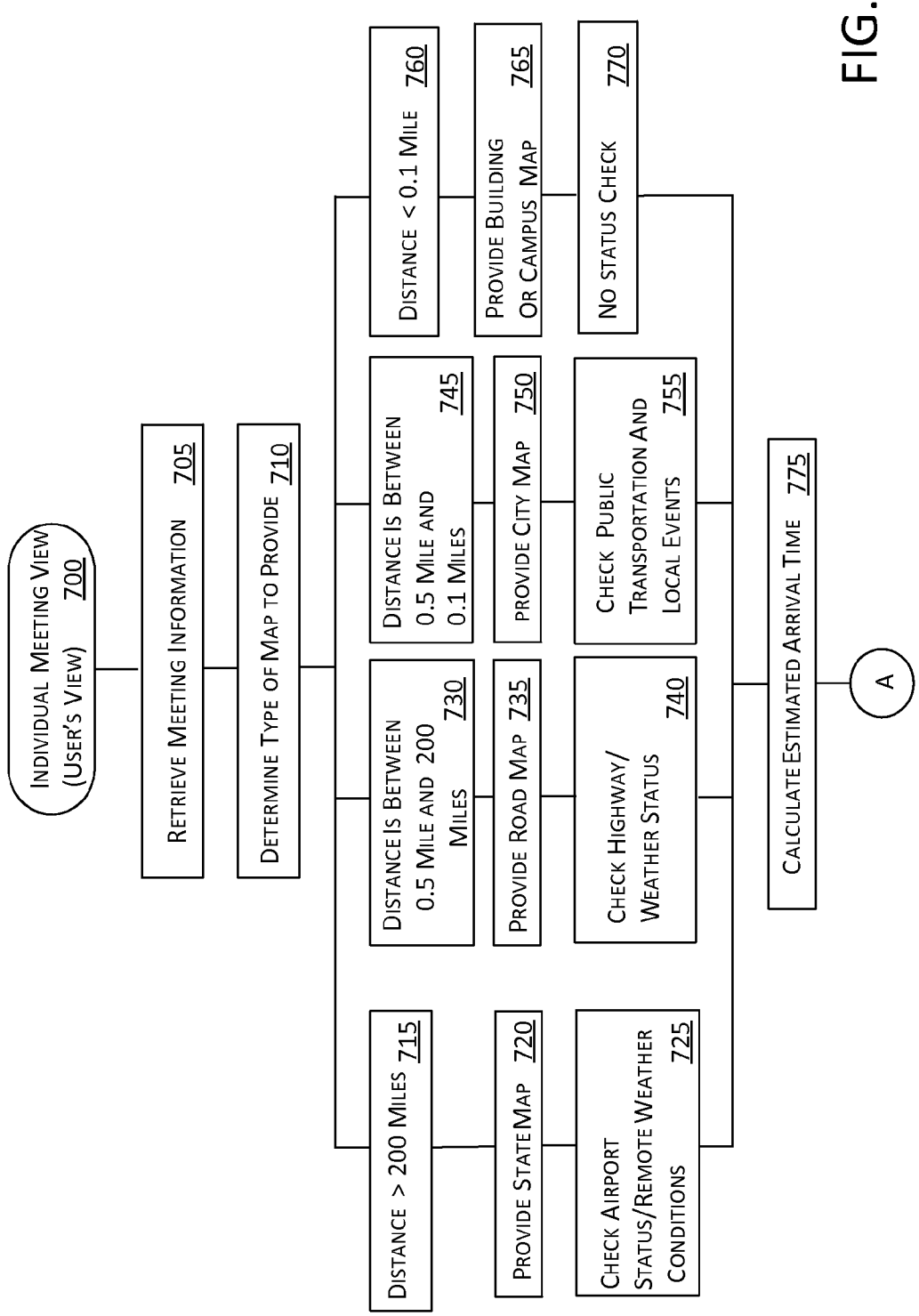
FIGS. 7A-7B illustrate a process flow for displaying location enhanced meeting map to a user according to one embodiment disclosed herein.
Figure 7B:
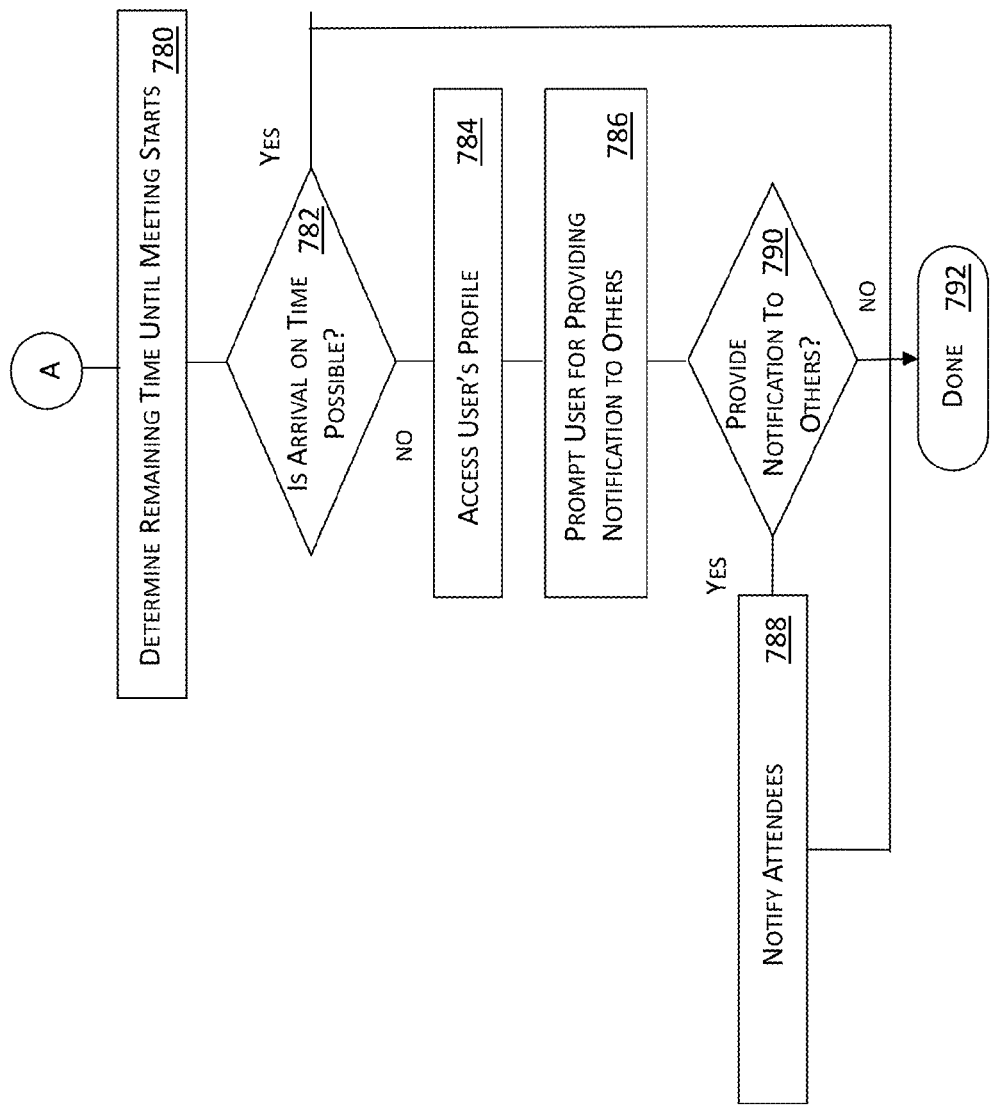

One process for providing a meeting-specific map view is shown in FIG. 7A. The process begins with the operation of retrieving the meeting information for the selected meeting. In one embodiment, this can be done by the server 108 processing a user request for the meeting-specific view. The server 108 (or a search engine accessed by the server 108) can determine the scale of a map to provide indicating the location information in operation 710. This can be based on the distance between the user and the meeting location. In operation 715, if the distance is above a threshold, e.g., 200 miles, it may be inferred that the user may be travelling by air to the meeting location. This assumption can be confirmed if the distance is too great to travel in the remaining time by car at normal highway speeds. In operation 720 a state level map can be provided to the user with the meeting location indicated. In operation 725, the LEM Service can determine, or prompt the user, and provide weather conditions associated with the destination location, and/or airport information.

If the distance to the destination is between e.g., 0.5 miles and 200 miles as indicated in operation 730, then it may be inferred that the user will drive to the meeting location. Thus, in operation 735 a roadmap is provided to the user. The LEM Service can then obtain weather and traffic conditions at the destination location in operation 740.

If the distance to the destination is between 0.5 and 0.1 miles in operation 745, then it may be inferred, the user will walk to the meeting location. Thus, in operation 750 a city street map is provided to the user. The LEM Service can provide local transportation information and local event status. The local event status could inform the user of festivals, sports events, conferences, or other conditions which may impact travel to the destination.

If the distance to the destination is less than 0.1 miles in operation 760, then it may be inferred that the user is walking to the location. Thus, in operation 765 a more detailed building or campus map is provided. Under these circumstances, the LEM Service may not check on traffic, weather, or airport conditions in operation 770. Instead, other information may be provided, such as building entrance location, building access hours, etc.

Once the appropriate map is determined, then in operation 775 the estimated arrival time is computed. This is computed based on the assumed mode of travel. For example, if it is inferred that the user is traveling to the meeting location by airplane, a buffer time for departure and arrival can be added to the expected travel time. If it is inferred the user is driving, then the estimated arrival time can be determined, by using an average car speed and the nature of the roads. If the user is inferred to be walking, an average walking speed can be determined. The estimated arrival time can be determined by the server 108 providing the LEM Service, or the server 108 can access a third party server providing such functions.

The expected arrival time may be compared with the meeting start time. If the user is expected to arrive on time in operation 782, then no further information may be provided to the user. If, in operation 782, it is determined that the user will be arriving later, then further processing may be involved. Specifically, in operation 784 the user's profile may be accessed, and the user may be prompted in operation 786 as to whether other attendees should be notified of the user's late arrival. The user may confirm this in operation 790, and if so, then in operation 788 a notification is provided to the attendees. The notification may indicate the expected arrival time, whether to proceed without the user, reschedule the meeting, etc. If no notification is sent, then the process is completed in operation 792.

The user's profile may be accessed to determine an appropriate option for handling a late arrival. The notification of late arrival could be configured in the user's profile to be automatically sent, or never sent. The notification may include information about the current user's location, or the user's profile may indicate that location information should not be sent. For example, a CEO of a company may have a privacy setting so that location information is never transmitted to other attendees. Other options are possible, and can be maintained in the user's profile. The user's profile can be defined to handle options on a per-meeting basis, or on a default basis for all meetings, or a combination thereof.

The process of providing a meeting-specific view can be repeated. A user may request a meeting-specific view when arriving, e.g., in a city for a meeting, again when driving to the meeting location, and again upon entering the office building where the meeting is. Each meeting-specific view and options presented to the user may vary based on the user's location and other factors. In this embodiment, if a notification of a late arrival is sent, it may be sent only once, and not each time the user accesses the meeting-specific view.

Providing location information about an attendee's location can be useful to the user. In this embodiment, it is assumed a user of the LEM Service receives location information regarding other attendees for a scheduled meeting. Attendees of an enterprise, for example, may agree to share location information with other users in the context of a scheduled meeting. Specifically, knowing where the other attendees are located just prior to, or at the beginning of, a meeting is useful to determine whether to begin the meeting or wait. In one embodiment, the location of the other attendees is only provided during a time period prior to, or during the meeting. Specifically, the location of potential attendees may be made available to the user for a time period, such as 15 minutes, prior to the start of a meeting. This would protect the attendee's location privacy outside the time period when the attendee's location with respect to the meeting location is relevant.

Figure 8A:
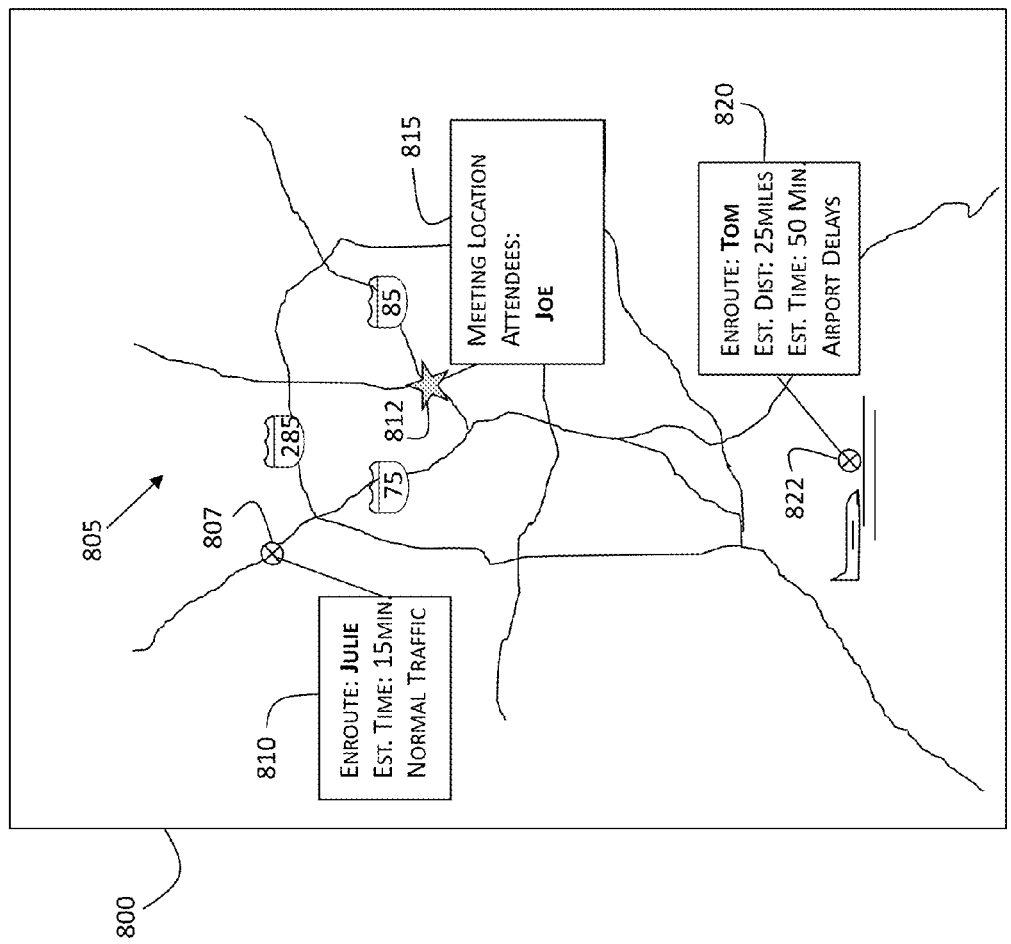
FIGS. 8A-8B illustrate a user interface for a meeting and the location of attendees according to one embodiment disclosed herein.

The benefit of providing an attendee's location just prior to a meeting can be illustrated using FIG. 8A. FIG. 8A illustrates a user interface for LEM Service indicating a meeting and the location of the invited attendees according to one embodiment presented herein. As shown in FIG. 8A, the user is presented with a map 805 illustrating the location of several attendees. The scale of the map presented is based on the relative distance of the various attendees from the meeting location.

The locations of the attendees are indicated on the map. For example, one attendee, Julie, is at an indicated location 807, and is likely traveling by car to the meeting location. An associated text box 810 provides the attendee's name and estimated arrival time. Further, based on positional information (e.g., near a highway), the LEM Service can retrieve associated traffic conditions and report the same to the user. In this embodiment, the traffic conditions are normal, so no traffic delays are expected. Another attendee is indicated by text box 815 as being present in another location 812. This location 812 is indicated using a different icon, which indicates the current location of the user. The user would be cognizant if he/she is present in the meeting location, and thus the user's name may not appear as an attendee at the meeting location. The user is mainly interested in the location of the other attendees.

Finally, another attendee, Tom, is indicated in text box 820 as located at the airport, which is suggestive of having traveled by airplane. In this case, the user is informed of a distance from the airport, along with an estimated arrival time. Because the attendee's location is associated with an airport, the LEM Service could retrieve information about airport conditions. In this embodiment, airport delays are reported. Various embodiments may provide other information, such as distance, notification of late arrival, or estimated arrival time. This map allows the user to determine whether and how long to wait before starting the meeting.

Based on the distance of the various attendees, supplemental information can be provided regarding a late arriving attendee. For example, traffic conditions can be queried and reported pertaining to attendees traveling by car. Airport delays may be appropriate if an attendee is traveling by airplane. Providing such data informs the user of a context for the length of the arrival delay or expected arrival time of the attendee.

The LEM Service can also ascertain a potential scheduling conflict. For example, if an attendee is scheduled for an earlier meeting, the LEM Service can infer the attendee will be late if the attendee has not left the earlier meeting at the estimated departure time. The LEM Service can automatically notify the other attendees of this, or upon request from the attendee that the attendee will arrive late or will be unable to attend the scheduled meeting. In one embodiment, the LEM Service initiates this notification only within a time window prior to the start of the meeting.

The LEM Service can be integrated or cooperate with other applications, such as a communication application and a contact organizing application. Thus, if an attendee is expected to be late in arriving to a meeting, the LEM. Service can retrieve contact information for the missing attendee and establish communications with the attendee. For example, a teleconference bridge could be established for all late attendees. This can be accomplished, in one embodiment, by presenting the user with a graphical user interface allowing the user to identify the late attendee and used a drop down menu presented to establish a conference call with the attendee.

Returning to FIG. 8A, the user could add Julie and Tom to a telephone conference bridge so that the meeting can continue on time, albeit with Julie and Tom participating via a conference bridge, in other embodiments, a video conference or other type of communications link can be established with the missing attendees.

Figure 8B:
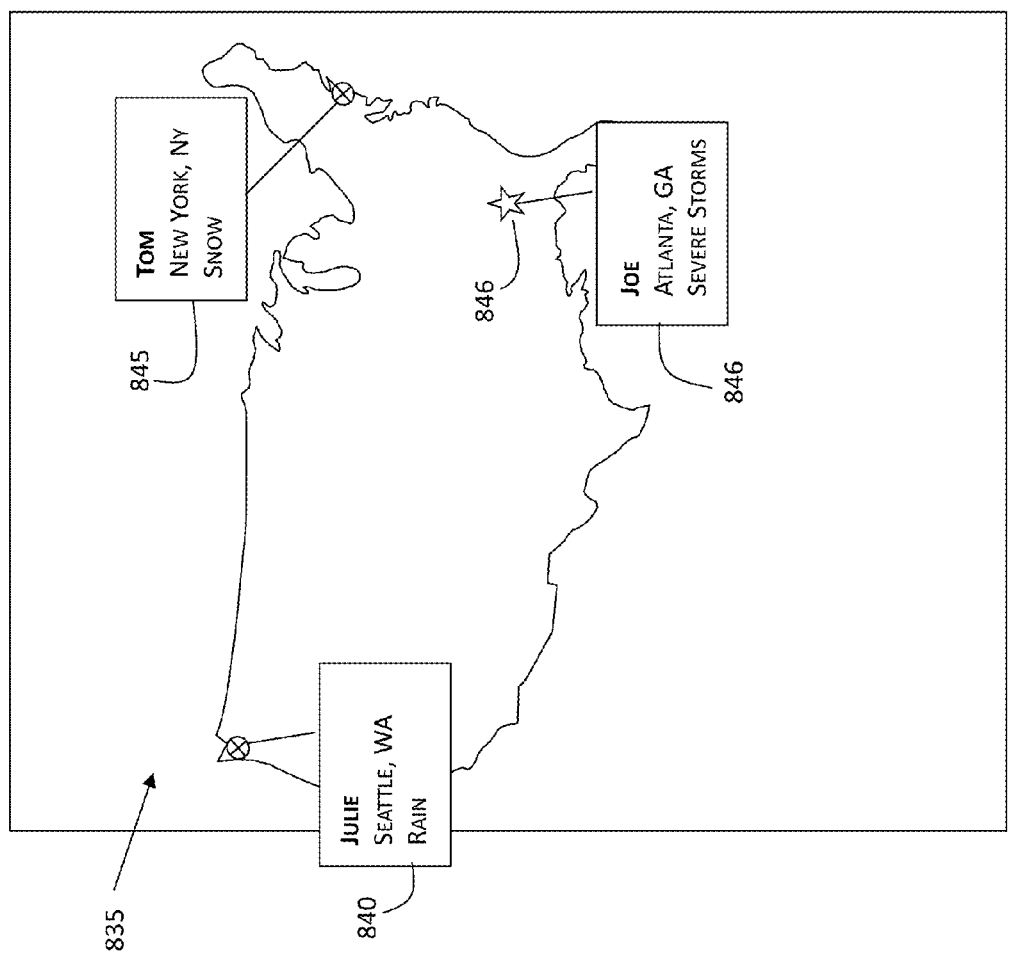

FIG. 8B illustrates another map of attendees attending a video conference/audio conference call, which are geographically diverse. Because the meeting is a conferencing type meeting, the attendees are not co-located in the same location. Hence, unlike the previous embodiment, the meeting may not have a geographic location. The map 835 reflects a scale appropriate to the distance of the various attendees. In this embodiment, a national map is shown, reflecting that some meeting attendees are attending via teleconference or video conference. As evident, a text box 840 informing of Julie's presence in Seattle is shown, along with a text box 845 informing of Tom's presence in New York. The user's location is indicated by a star icon 846 along with a text box 845 informing of the other attendee, Joe. In this embodiment, the server can determine the "presence" of the remote attendees by verifying establishment of a communications link of some form.

The map shown in FIG. 8B can be augmented with local events, weather, or other information which is incidental to the conference. This incidental information allows a user to be cognizant of local conditions, which can aid in small-talk and socialization prior to the meeting. Thus, local external such as local weather conditions can be indicated in the various text boxes 840, 845, and 846.

Figure 9A:
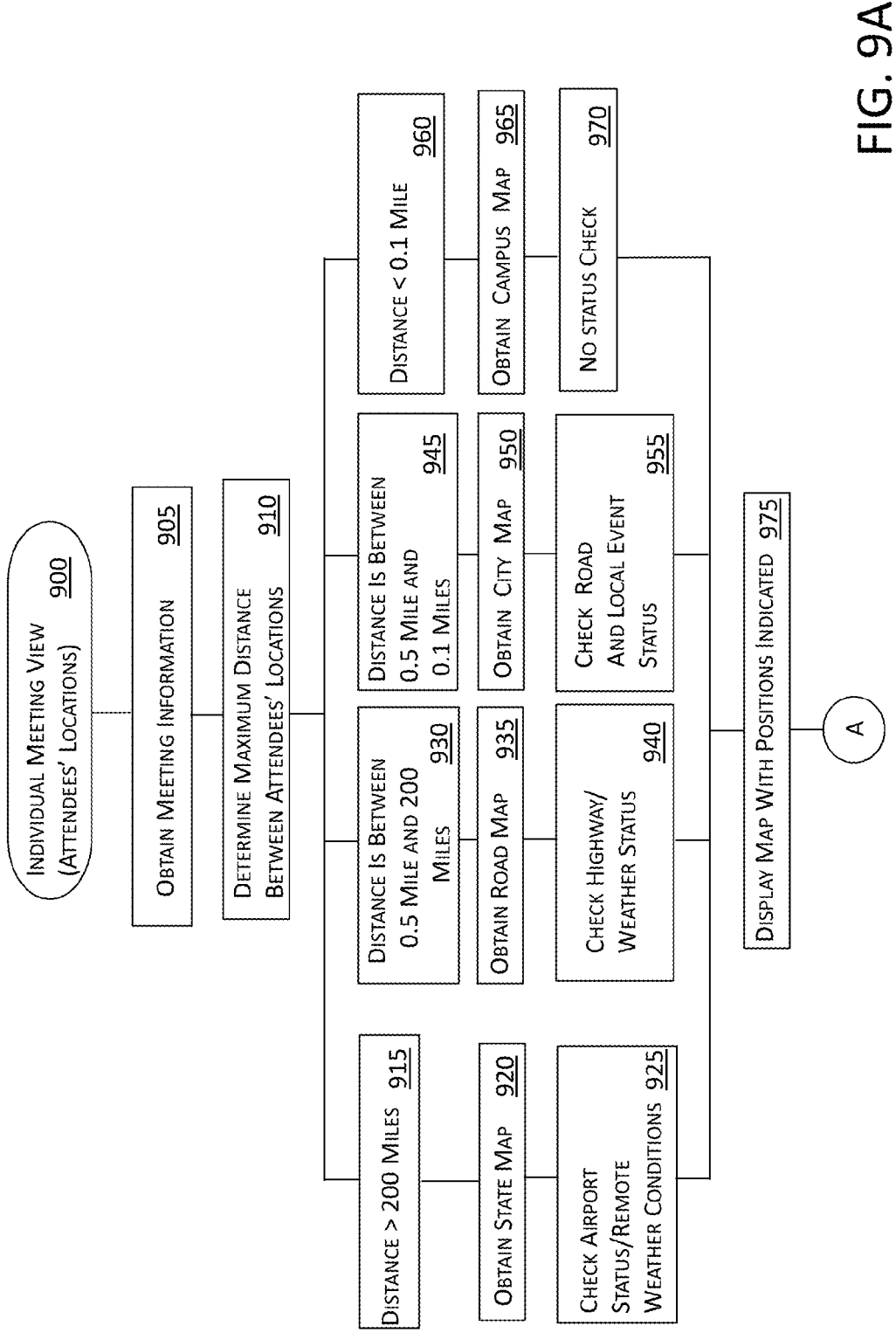
FIGS. 9A-9B illustrate a process flow for displaying a location enhanced meeting map and the location of attendees as disclosed according to one embodiment disclosed herein.
Figure 9B:
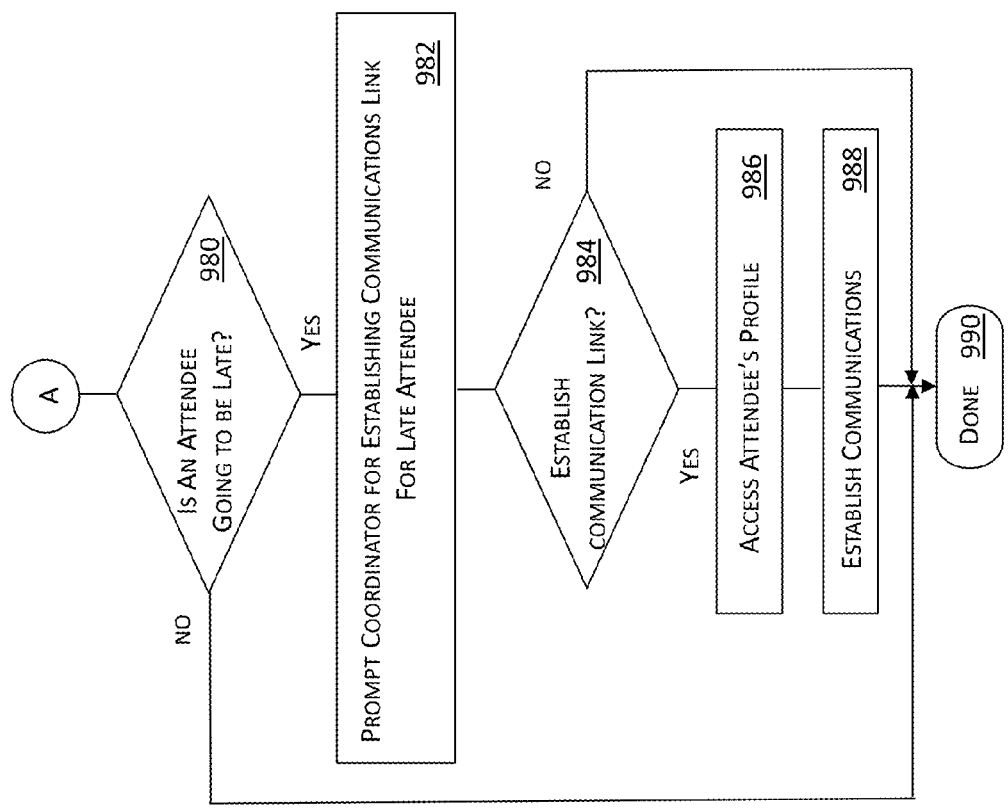

A process for a server 108 producing the attendee's position on a location enhanced meeting map is shown in FIGS. 9A-9B. The location enhanced meeting map indicates the locations of the various attendees (except for the user) on a geographical map. The process begins with operation 905 with obtaining meeting information, which may include the start time, the location, and a list of attendees. The server 108 in operation 910 may then obtain a location for each attendee. The attendee's location may be obtained by the server querying a mobile device associated with each attendee, or accessing a storage memory or another server maintaining a current location of each attendee, which is updated periodically by each attendee.

Once the current locations of the attendees are known, a determination of the distance between the various attendees is determined in operations 915, 930, 945, and 960. Based on the maximum distance required to be displayed on the map, a state-level map 920, a road-level map 935, a city map 950, or a campus or building map 965 is respectively retrieved.

The locations of the attendees also allow an inference of whether the attendees are attending by airport, road, or by foot. Depending on the distance and location of the attendee, the server may also query a search engine for airport or remote weather conditions 925, highway and weather conditions 940, local road conditions and local events 955, or if no check is required 970. The search for conditions is illustrative, and other types of information searches may be performed.

Once the information regarding the attendee's positions is known, the appropriate map and associated conditions are determined. The map displaying the attendee's positions can be provided in operation 975.

In certain embodiments, an attendee's position may be purposefully indicated within a general area on the map, as opposed to indicating a pin-point location. Privacy concerns may dictate that the attendee's position is indicated, for example, within a circular zone. The level of privacy afforded can be maintained in a profile for that attendee, and the server could access the attendee's profile before producing the map. In other embodiment, the attendee's privacy can be maintained by only allowing the location of attendees to be presented on the map within a time period just before the meeting. With this restriction, it would not be possible to "track" attendees in the days prior to a meeting, but only within a limited time before the meeting.

The map can also display an estimated travel and/or arrival time for an attendee in operation 980. If no attendee is expected to arrive late, then no further information may be provided to the user. If an attendee is expected to arrive late, the user can be prompted to establish a communications link with the attendee in operation 984. The communications link with the late attendee can be established by the server 108 in cooperation with a communications application server. The communication link could be a voice-over IP for a voice call, or some other form. The server is able to determine the attendee's communication capability by accessing the attendee's profile in operation 986, and then establish communications with the attendee in operation 988. In this manner, the location information of the attendee can facilitate the user determining whether the meeting should be delayed, started without the attendee, rescheduled, or have the attendee participate using a separate established communications link.

The LEM Service can also use location information of users to derive the existence of a meeting that is not scheduled for the users. For example, the presence of a number of personnel in a particular location ("crowd-sourcing") could result in determining that a meeting is occurring. This information could be used to then update schedules and resource availability, such as e.g., a room scheduling program. Specifically, a conference room occupied by several individuals could be reported as occupied to a room scheduling application program by the LEM Service. The conference room could then be shown as in use, if otherwise not already scheduled.

In another embodiment, the location of a number of individuals in a room could allow the LEM Service to infer that those individuals are in a meeting, and update an availability status for those individuals. For example, the LEM Service can infer a user is in a meeting when the user is with another group, even though there is no scheduled meeting associated with that user's calendar. The user's calendar application can then update the user's schedule as if they were in a scheduled meeting for availability purposes.

In another embodiment related to crowd sourcing, the LEM Service can allow the system to ascertain a location associated with a meeting location, which is not known by the LEM Service. For example, a meeting location may be referred to by users by a unofficial name. For example, the "brainstorm room" may colloquially refer to a certain individual's office or conference room. While the official designation of the room may be recognized by the LEM Service, the colloquial designation may not be initially recognized. However, the LEM Service can detect where the meeting attendees are located at the time the meeting is scheduled for the "brainstorm room" and associate the colloquial designation with the official location. Hence, the next time a meeting is schedule using the colloquial designation, the LEM Service will associate the alias with the official room designation. In this manner the system can "learn" the location of meeting locations.

Based on the foregoing, it should be appreciated that systems and methods have been disclosed for providing location enhanced meeting services that may involve providing the user with geographical maps with the location of meetings and/or attendees to those meetings. It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A system for providing location enhanced meeting information, comprising:
   a memory storing meeting location information for a user; and
   a processor configured to receive a request for a location enhanced meeting map for a meeting, wherein the processor is configured to
   determine a time period between a current time and a starting time of the meeting,
   determine the time period is below a threshold,
   query a location server for a location of an attendee,
   query an estimated time of arrival server for an estimated time of arrival for the attendee,
   determine a late arrival time of the attendee to the meeting location by determining the attendee has not left an earlier scheduled meeting by an estimated departure time, and
   provide the user with the location enhanced meeting map, the location enhanced meeting map indicating a location of the meeting, the location of the attendee and the late arrival time of the attendee.

2. The system of claim 1, wherein the processor is further configured to:
   provide the user with a prompt for establishing a communications link with the attendee;
   receive confirmation from the user to establish the communications link;
   establish the communications link with the attendee; and
   provide an updated location enhanced meeting map indicating the establishment of the communications link between the user and the attendee.

3. The system of claim 2, wherein the communication link is a teleconference bridge between the attendee and the user.

4. The system of claim 1, wherein the processor is further configured to:
   query a traffic conditions server for traffic conditions associated with a location of another attendee and the location of the meeting; and
   use the traffic conditions for determining the estimated time of arrival for the other attendee.

5. The system of claim 4, wherein the processor is further configured to display the traffic conditions on the location enhanced meeting map including an image from a traffic camera.

6. The system of claim 1, wherein the location enhanced meeting map further comprises, weather conditions associated with another attendee location on the location enhanced meeting map.

7. The system of claim 1, wherein the processor is further configured to:
- determine a late arrival time of the user comprising a difference between an estimated arrival time of the user and the starting time of meeting;
- provide a late arrival notification prompt to the user if the late arrival time exceeds the threshold level; and
- in response to the user selecting the late arrival notification prompt, notify the attendee that the user will arrive late.

8. A method for providing location enhanced meeting information, comprising:
- receiving a request for a location enhanced meeting map for a meeting;
- determining a time period between a current time and a starting time of the meeting;
- determining the time period is below a threshold;
- querying a location server for a location of an attendee;
- querying an estimated time of arrival server for an estimated time of arrival for the attendee;
- determining a late arrival time of the attendee to a meeting location by determining the attendee has not left an earlier scheduled meeting by an estimated departure time; and
- providing the user with the location enhanced meeting map, the location enhanced meeting map indicating a location of the meeting, the location of the attendee and the late arrival time of the attendee.

9. The method of claim 8, further comprising:
- providing to the user of a mobile computing device a prompt to establish a communications link with the attendee;
- receiving in response to the prompt a request from the user to establish the communication link; and
- using the meeting location information to establish the communication link between a mobile computing device of the attendee and the mobile computing device of the user.

10. The method of claim 9 wherein the location enhanced meeting map is updated to reflect the establishment of the communication link with the attendee.

11. The method of claim 9 further comprising:
- determining a late arrival time of the user comprising the difference between an estimated arrival time of the user and the starting time of meeting;
- providing a late arrival notification prompt to the user if the late arrival time exceeds the threshold level; and
- in response to the user selecting the late arrival notification prompt, notifying the attendee that the user will arrive late.

12. The method of claim 9, wherein the communication link is a teleconference bridge between the attendee and the user.

13. The method of claim 8 further comprising:
- determining the time period exceeds the threshold; and
- providing the user the meeting location map indicating the user location and the attendee location in response to the request if the time period exceeds the threshold.

14. The method of claim 8, wherein the location enhanced meeting map further comprises, displaying an image from a traffic camera on the location enhanced meeting map.

15. The method of claim 8, wherein the location enhanced meeting map further comprises, weather conditions associated with another attendee location on the location enhanced meeting map.

16. A computer readable storage medium having computer readable instructions stored thereupon, that when executed by a computer cause the computer to:
- receive a request for a location enhanced meeting map for a meeting;
- determine a time period between a current time and a starting time of the meeting;
- determine the time period is below a threshold;
- query a location server for a location of an attendee;
- query an estimated time of arrival server for an estimated time of arrival for the attendee;
- determine a late arrival time of the attendee to a meeting location by determining the attendee has not left an earlier scheduled meeting by an estimated departure time; and
- provide the user with the location enhanced meeting map, the location enhanced meeting map indicating a location of the meeting, the location of the attendee and the late arrival time of the attendee.

17. The computer readable storage medium of claim 16, wherein the location enhanced meeting map further comprises displaying an image from a traffic camera.

18. The computer readable storage medium of claim 16, wherein the location enhanced meeting map further comprises displaying airport delays.

19. The computer readable storage medium of claim 16, further comprising computer-readable instructions thereupon that, when executed by the computer, cause the computer to:
- provide to the user a prompt to establish a teleconference bridge with a plurality of meeting attendees;
- receive in response to the prompt, a request from the user to establish the teleconference bridge;
- use the meeting location information to establish the teleconference bridge between the plurality of meeting attendees; and
- update the location enhanced meeting map to indicate the establishment of the teleconference bridge between the plurality of meeting attendees.

20. The computer readable storage medium of claim 19, wherein the meeting location is a virtual meeting location and wherein the presence of the plurality of meeting attendees to the virtual meeting location is determined by establishing the teleconference bridge.

* * * * *